Patented Nov. 26, 1940

2,223,333

UNITED STATES PATENT OFFICE 2,223,333

PRODUCTION OF MELAMINE

Jack T. Thurston, Stamford, Conn., assignor to American Cyanamid Company, New York, N. Y., a corporation of Maine No Drawing. Application October 28, 1939, Serial No. 301,765

10 Claims. (Cl. 260—248)

This invention relates to the production of melamine by the heat conversion of cyanamide or dicyandiamide. An object of the invention is to provide a heat conversion method for cyanamide and dicyandiamide which will produce improved yields of melamine, as compared with heat conversion processes now in use.

I have found that improved yields of melamine are obtained when dicyandiamide, cyanamide or mixtures thereof are heated while dispersed in or with lactamide, and preferably in the presence of a small amount of an acid condensing agent such as anhydrous zinc chloride, aluminum chloride and the like. I believe that the action of lactamide in producing improved yields of melamine is quite specific, for such closely related compounds as acetamide do not give comparable results.

Although the acid condensing agent is an important factor in obtaining improved yields of melamine by the process of my invention, only small amounts of this material need be present and, in fact, I have found that its presence in amounts much greater than 0.1 mole per mole of dicyandiamide will produce inferior results. The most favorable range of concentration of the acid condensing agent appears to be on the order of 0.01 to 0.001 mole per mole of dicyandiamide, and the presence of these amounts of acid condensing agent such as zinc chloride, aluminum chloride, calcium chloride and the like during the heat conversion of cyanamide or dicyandiamide constitutes an important feature of the invention.

The conversion of the dicyandiamide or cyanamide may take place in the presence of lactamide alone, preferably with addition of the acid condensing agent, or a mixture of the dicyandiamide or cyanamide, lactamide and condensing agent may be suspended in a liquid heating medium. In the latter case a liquid is preferably chosen which boils at or near the preferred conversion temperature range, which is about 150–170° C. An inert heating liquid such as dipentene or toluene should preferably be chosen as any tendency of the product to hydrolyze in a polar solvent in the presence of the acid catalyst is thereby avoided.

The invention will be illustrated in greater detail by the following specific examples. It is understood, however, that although these examples may describe in detail certain of the more specific aspects of the invention, they are given primarily for purposes of illustration and the invention in its broader aspects is not limited thereto.

Example 1

84 parts of dicyandiamide, 89 parts of lactamide and 1 part of anhydrous zinc chloride were heated together at 160° C. for 1 hour. The resulting tan-colored material was extracted with alcohol and acetone to remove unchanged lactamide and was then analyzed for melamine.

The residual material, which amounted to 89% of the weight of the dicyandiamide used, was found to contain 85% melamine. This represents a total overall yield of more than 75% of melamine.

Example 2

One mole of dicyandiamide, one mole of lactamide and 0.1 mole of anhydrous calcium chloride were heated on an oil bath having a temperature of 160° C. During the first hour a homogeneous solution was maintained. Upon further heating with agitation a precipitate began to form, and after a total heating period of 2½ hours the reaction was complete. After cooling the precipitate was filtered off, washed, sludged up with boiling water and again filtered after cooling in ice water. An overall yield of 40% of melamine was obtained.

When equal quantities of anhydrous aluminum chloride were substituted for the calcium chloride a similar conversion of the dicyandiamide to melamine was obtained, but the product became gummy upon continued heating. When the quantity of aluminum chloride was reduced to 1 gram, however, results similar to those described in Example 1 were obtained.

Example 3

16.8 parts by weight of dicyandiamide, 17.8 parts of lactamide and 0.6 part of anhydrous zinc chloride were dispersed in 170 parts by weight of dipentene and heated to reflux temperatures of 155–160° C. After refluxing for two hours, during which time ammonia was liberated, the mixture was cooled and the solvent decanted. 300 parts of water were added and the mixture was heated to boiling and filtered, leaving a small residue which was extracted with another 100 parts of boiling water. The combined filtrates were agitated with decolorizing carbon and allowed to cool.

A crystallized melamine of good purity was obtained, the yield being 64% of theory.

What I claim is:

1. A process of producing melamine which comprises heating a member of the group consisting of cyanamide and dicyandiamide dispersed in lactamide in the presence of a small amount of an acid condensing agent.

2. A process of producing melamine which comprises heating a member of the group consisting of cyanamide and dicyandiamide dispersed in lactamide in the presence of a small amount of zinc chloride.

3. A process of producing melamine which comprises heating a mixture of a member of the group consisting of cyanamide and dicyandiamide and lactamide in the presence of a small quantity of an acid condensing agent, said quantity being in the order of 0.01 to 0.001 mole per mole of dicyandiamide.

4. A process of producing melamine which comprises heating a mixture of a member of the group consisting of cyanamide and dicyandiamide and lactamide in the presence of a small quantity of zinc chloride, said quantity being in the order of 0.01 to 0.001 mole per mole of dicyandiamide.

5. A process of producing melamine which comprises heating dicyandiamide dispersed in lactamide in the presence of a small amount of an acid condensing agent.

6. A process of producing melamine which comprises heating dicyandiamide dispersed in lactamide in the presence of a small amount of zinc chloride.

7. A process of producing melamine which comprises heating a mixture of dicyandiamide and lactamide in the presence of a small quantity of an acid condensing agent, said quantity being in the order of 0.01 to 0.001 mole per mole of dicyandiamide.

8. A process of producing melamine which comprises heating a mixture of dicyandiamide and lactamide in the presence of a small quantity of zinc chloride, said quantity being in the order of 0.01 to 0.001 mole per mole of dicyandiamide.

9. A process of producing melamine which comprises heating a member of the group consisting of cyanamide and dicyandiamide together with lactamide in an inert liquid heating medium in the presence of a small amount of an acid condensing agent.

10. A process of producing melamine which comprises heating a member of the group consisting of cyanamide and dicyandiamide together with lactamide in an inert liquid heating medium in the presence of a small amount of zinc chloride.

JACK T. THURSTON.